Sept. 25, 1923.  
C. W. WEISS  
1,469,061  
TRANSMISSION DEVICE  
Filed Jan. 6, 1923    2 Sheets-Sheet 1
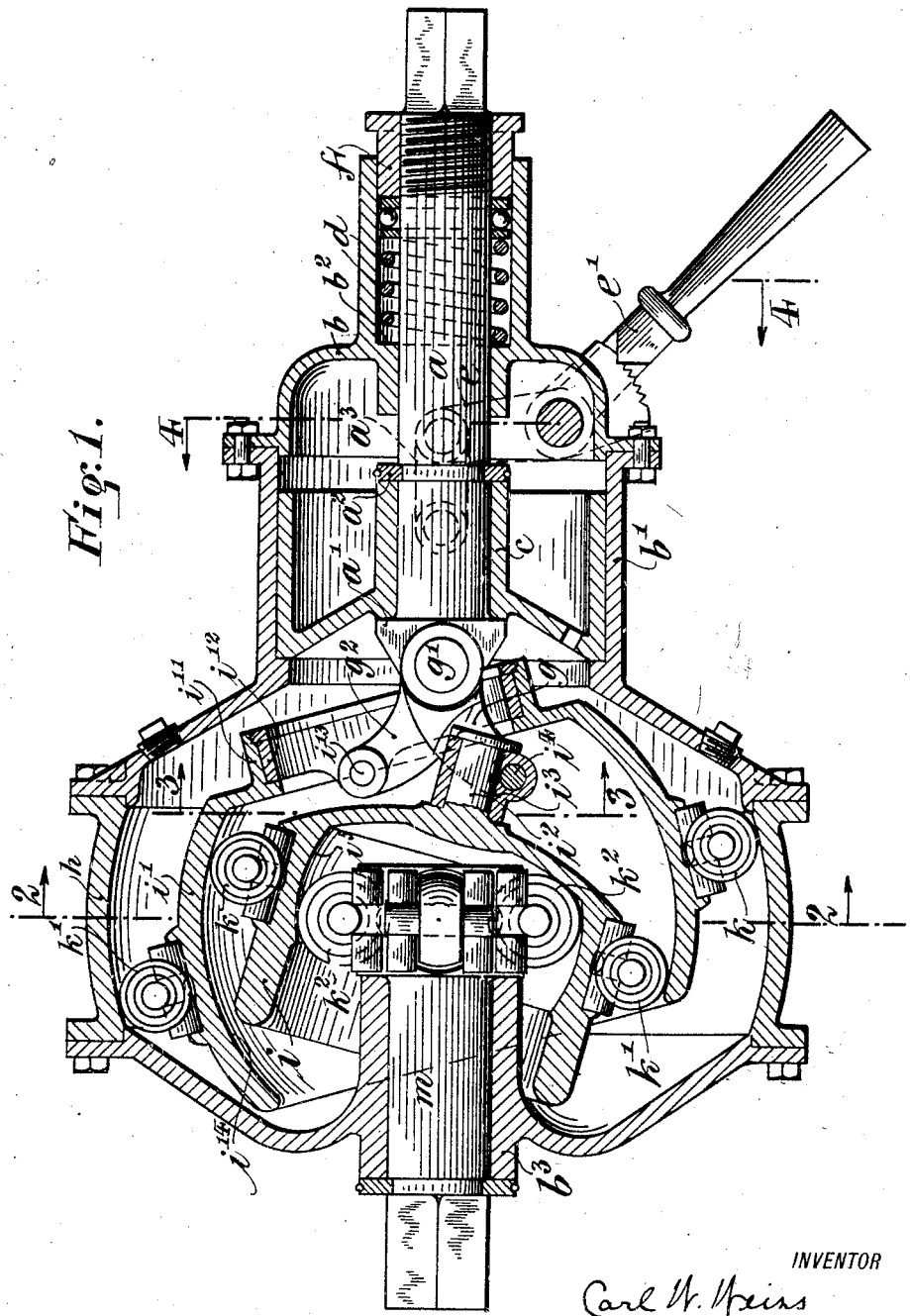

Sept. 25, 1923.  C. W. WEISS  1,469,061
TRANSMISSION DEVICE
Filed Jan. 6, 1923  2 Sheets-Sheet 2
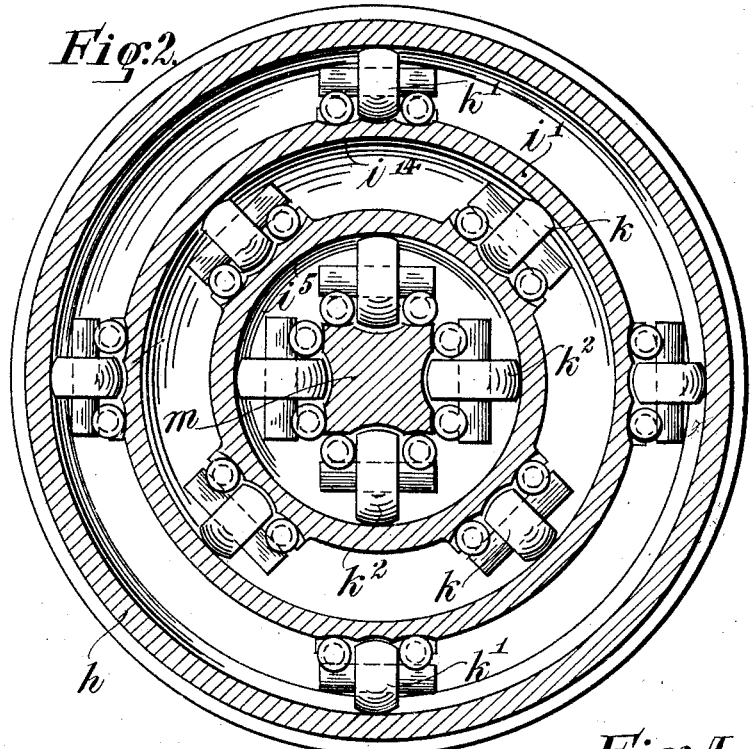
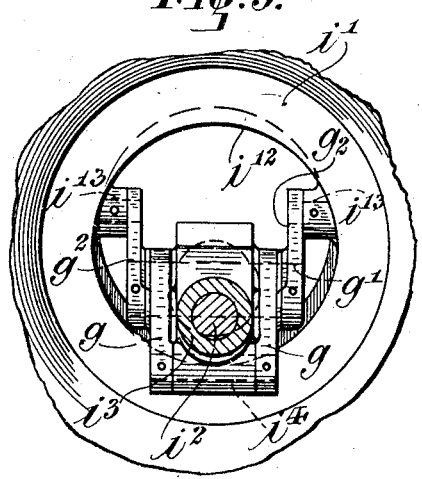
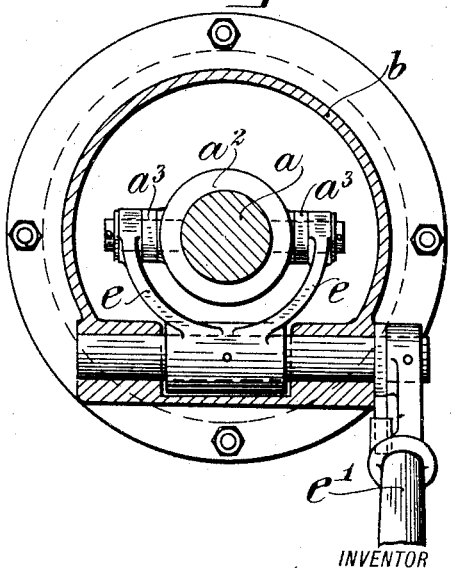
INVENTOR
Carl W. Weiss
BY
Redding & Greeley
ATTORNEYS Patented Sept. 25, 1923.

1,469,061

UNITED STATES PATENT OFFICE.

CARL W. WEISS, OF BROOKLYN, NEW YORK.

TRANSMISSION DEVICE.

Application filed January 6, 1923. Serial No. 610,987.

*To all whom it may concern:*

Be it known that I, CARL W. WEISS, a citizen of the United States, residing in the borough of Brooklyn of the city of New York, in the State of New York, have invented certain new and useful Improvements in Transmission Devices, of which the following is a specification, reference being had to the accompanying drawings, forming a part hereof.

This invention relates to transmission devices of the general character of that shown in Letters Patent of the United States No. 1,146,982, dated July 20, 1915, in which power is transmitted through a nutating body which receives a movement of rotation on its own axis proportional to the angular displacement of the axis of rotation with respect to the axis of nutation, the speed ratio being varied by varying such angle of displacement. Provision was made in the device as shown in said patent for compensating for the unbalanced action of the link connecting the driving member with the mutor by counterweighting the link, but it has been found in practice, when the device is operated at high speed, that there is unbalanced action of the nutating body or mutor itself and it is the purpose of the present invention to overcome such unbalanced action. To this end there are provided, between the driving member and the driven member, two nutating bodies or mutors which are disposed in opposition to each other, as regards their respective movements of nutation, so that the device, when the parts are properly designed, is perfectly balanced under all conditions; in other words the arrangement is such that any movement of one which tends to produce an unbalancing effect in the transmission is compensated for by a movement of the other which will have an equal and opposed or neutralizing unbalancing effect, the net result being the maintenance of the mechanism in perfect balance. The invention will be explained more fully hereinafter with reference to the accompanying drawings in which it is illustrated and in which—

Figure 1 is a view partly in longitudinal central section and partly in elevation of one form of transmission device which embodies the present improvement.

Figures 2, 3 and 4 are respectively views in transverse section on the planes indicated by the broken lines 2—2, 3—3 and 4—4 of Figure 1, looking in the direction of the arrows, the parts being represented in Figure 2 in the positions which they would assume if the axes of the two mutors coincided with the axis of the driving and driven members.

The driving member or shaft $a$ is shown as mounted for rotation in a suitable bearing in the housing $b$ and as movable longitudinally therein to a limited extent. A sleeve $c$, which encircles the shaft $a$ between a shoulder $a'$ and a collar $a^2$, is supported for longitudinal movement in the part $b'$ of the housing and is connected by links $c^3$ with the forks $e$ of an operating lever $e'$. A spring $d$, acting between a shoulder $b^2$ of the housing and a sleeve nut $f$, tends normally to move the shaft $a$ toward the right in Figure 1.

The housing supports at $h$, the internally spherical bearing member, described in said patent, and has at $b^3$ a bearing for the driven member $m$.

Disposed within the internally spherical bearing member $h$ and concentric therewith, are the two nutating bodies or mutors $i$ and $i'$, each of which functions in substantially the same manner as the nutating body or mutor described in said patent. The mutor $i$ has an axial stud $i^2$ encircled by a sleeve $i^3$ which is pivotally connected, as at $i^4$, with a forked link $g$, the latter being pivotally connected, as at $g'$, with the head of the shaft $a$. The nutating body or mutor $i'$ has an internally grooved collar $i^{11}$ about an aperture which encircles and is large enough to permit the movement of the link $g$ as hereinafter described, the collar being concentric with the axis of the mutor $i'$. Within the groove of the collar $i^{11}$ is received freely an annulus $i^{12}$, also of such diameter as to permit the free movement of the links $g$ and also of links $g^2$ which are pivoted at $i^{13}$ on the annulus and at $g'$ on the head of the shaft $a$. It will be noted that the parts are so constructed and operatively related that the two mutors may be brought into axial alignment, the axis of alignment in the form of apparatus shown coinciding with the axis of the driving member and the driven member. It will also be noted that the connections are so proportioned and disposed that the angular displacement of the two mutors, as the shaft $a$ and transverse pivotal axis $g'$ are moved toward or from the center of the spherical bearing surface $h$, shall be always equal and opposite, The two mutors and their associated parts are also designed so that the moments of inertia of the two mutors and their associated parts shall be substantially equal in all positions.

The mutor $i'$ carries rolling gripping members $k'$ which co-operate with the internally spherical bearing surface $h$, as described in said patent while the mutor $i$ carries rolling gripping members $k$ which co-operate in the same manner with the internally spherical bearing surface $i^{14}$ of the mutor $i'$.

As a means for communicating the movement of rotation of the mutor $i$ to the driven member $m$ the mutor $i$ is shown as having an internally spherical bearing surface $i^5$ for co-operation with rolling gripping members $k^2$ carried by the driven member $m$ as described in said patent.

The mode of operation of the improved transmission device is the same as that of the transmission device described in said patent, the inner of the two mutors co-operating with the outer mutor in the same manner as the outer co-operates with the stationary bearing surface $h$, the resultant movement of rotation of the inner mutor $i$ being communicated to the driven member as already described. It will be understood that, in the operation of the apparatus shown, if there is no pressure on the operating lever $e'$ the spring $d$ will retain the driving shaft $a$ in its extreme right hand position and the two mutors in their respective neutral positions, with their axes in alignment. When, however, pressure is applied to the operating lever, the driving shaft $a$ will be moved to the right and, through the respective links $g$ and $g^2$ the two mutors will be displaced angularly in opposite directions and to an equal extent so that, in the movements of nutation, the two mutors and their connected parts mutually balance each other as well in their movements of nutation as in their movements of rotation.

I claim as my invention:

1. A transmission device comprising a driven member, two co-operating, oppositely disposed mutors, means to impart to both mutors movement of nutation in opposition, and means to impart the movement of rotation of the mutors to the driven member.

2. A transmission device comprising a driven member, two co-operating, oppositely disposed, concentric mutors, means to impart to both mutors movement of nutation in opposition, and means to impart the movement of rotation of the inner mutor to the driven member.

3. A transmission device comprising a driven member, two co-operating, oppositely disposed, concentric mutors, a concentric spherical bearing surface for co-operation with one of said mutors, means to impart to both mutors movement of nutation in opposition, and means to impart the movement of rotation of the other of said mutors to the driven member.

4. A transmission device comprising a driven member, two co-operating, oppositely disposed mutors, a driving member, links connecting the driving member to the mutors in opposition, and means to impart the movement of rotation of the mutors to the driven member.

5. A transmission device comprising a driven member, two co-operating, oppositely disposed, concentric mutors, a driving shaft, links connecting the driving shaft to the mutors in opposition, one of said mutors having an opening to permit the passage and movement of the link connection of the other mutor, and means to impart the movement of rotation of the inner mutor to the driven member.

6. A transmission device comprising a driving member and a driven member, means comprising two co-operating mutors for transmitting rotation from the driving to the driven member, each mutor being movable into positions where independently of the other it would tend to unbalance the apparatus during rotation, and means for shifting said mutors one with respect to the other so that the unbalancing action of one will tend to neutralize the unbalancing action of the other.

This specification signed this 19th day of December, A. D. 1922.

CARL W. WEISS.